No. 665,001. Patented Jan. 1, 1901.
S. M. GREEN.
COMBINATION TOOL.
(Application filed May 7, 1900.)
(No Model.)
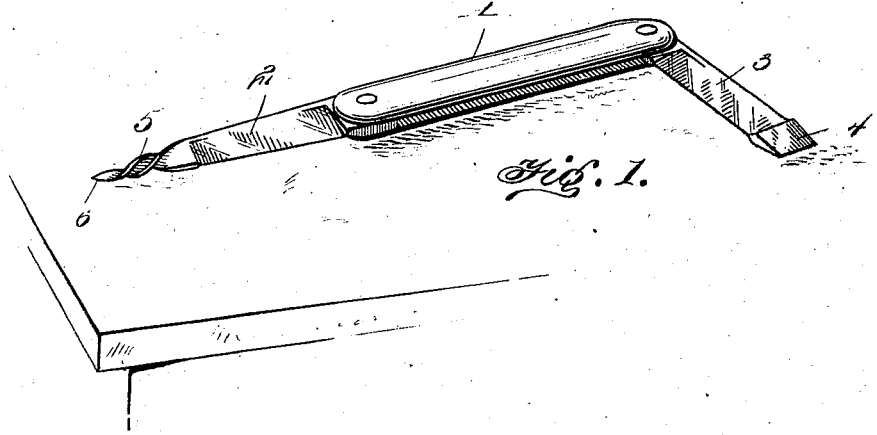
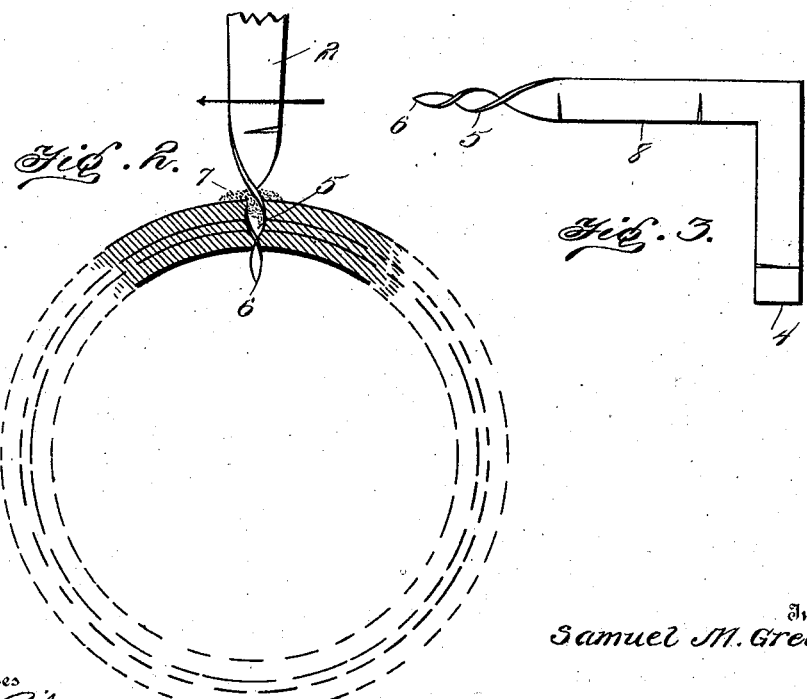
Witnesses
Inventor
Samuel M. Green
By Victor J. Evans
Attorney

UNITED STATES PATENT OFFICE.

SAMUEL MILTON GREEN, OF SAN ANTONIO, TEXAS.

COMBINATION-TOOL.

SPECIFICATION forming part of Letters Patent No. 665,001, dated January 1, 1901.

Application filed May 7, 1900. Serial No. 15,743. (No model.)

*To all whom it may concern:*

Be it known that I, SAMUEL MILTON GREEN, a citizen of the United States, residing at San Antonio, in the county of Bexar and State of Texas, have invented new and useful Improvements in Combination-Tools, of which the following is a specification.

This invention relates to new and useful improvements in combination-tools; and its primary object is to provide a device of this character especially adapted for repairing rubber tires, &c.

To this end the invention consists in the novel construction and combination of parts hereinafter more fully described and claimed, and illustrated in the accompanying drawings, showing the preferred form of my invention, and in which—

Figure 1 is a perspective view thereof. Fig. 2 is a view showing the coiled end thereof in use, and Fig. 3 is a modified form of tool.

Referring to said figures by numerals of reference, 1 is a handle, within which are pivotally mounted two cutting-blades 2 and 3, respectively, one of which, 3, is provided at its end with a broad wedge-shaped portion 4 to form a screw-driver. The remaining blade 2 terminates in a worm or coil 5, provided with blunt edges and terminating in a point 6, as shown.

When it is desired to repair a tire, cement, as 7, is placed upon the puncture, and the worm 5 is screwed thereinto away from the edges thereof, as shown by the arrow in Fig. 2. This, as is obvious, will carry the cement downward into the tire, thoroughly coating the walls of the puncture. The tool is then removed and a plug of suitable form and material inserted thereinto. The cutting edge of the blade 2 may then be used for removing that portion of the plug which projects from the surface of the tire.

The blade 3 and its end 4 will make an efficient screw-driver, as will be readily understood.

In Fig. 3 I have shown a modified form of tool, which is substantially L-shaped in form and has but one cutting edge 8, as shown.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

I claim—

1. In a pocket-knife, a cutting-blade, pivotally secured to the handle at one end thereof, and the other or free end enlarged or thickened to form a wedge-shaped tool-head.

2. In a pocket-knife, a handle; cutting-blades pivotally secured to each end thereof; the ends of said blades being enlarged or thickened, and being provided respectively with a tapered worm and a wedge-shaped tool-head.

3. In a pocket-knife, the combination with the handle; of a pivoted member, one edge of which is formed with a cutting-blade and the other end of which is enlarged to form a wedge-shaped tool-head.

In testimony whereof I affix my signature in presence of two witnesses.

SAMUEL MILTON GREEN.

Witnesses:
C. M. COBLE,
E. J. REEVES.